Jan. 29, 1924. 1,481,862
J. H. EISENBERG
BRAKE SHOE
Filed Jan. 30, 1923
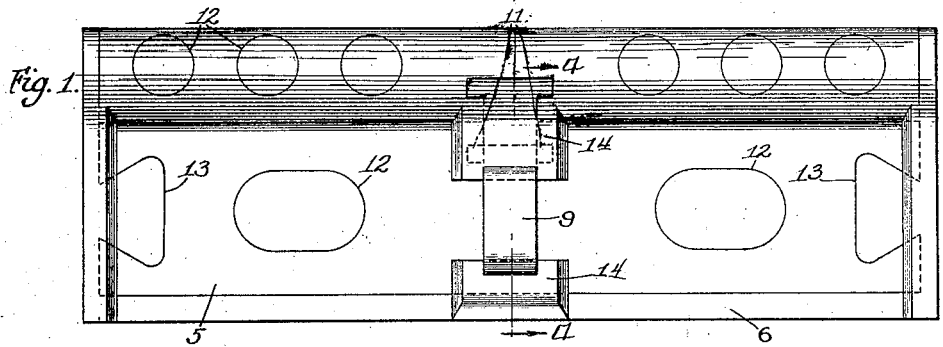
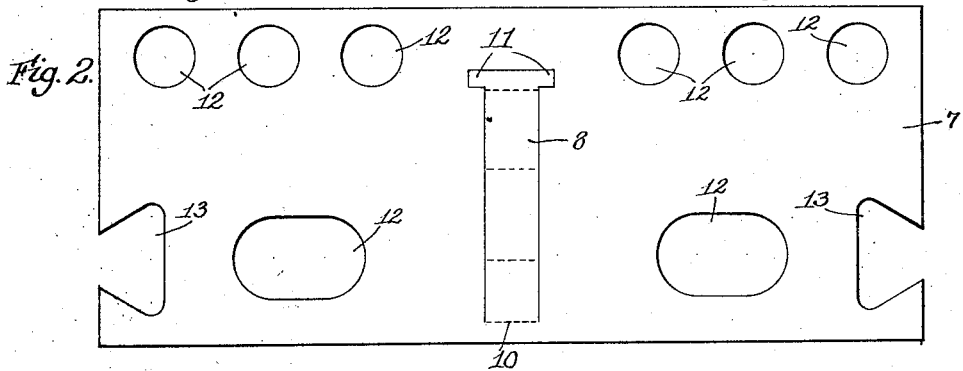
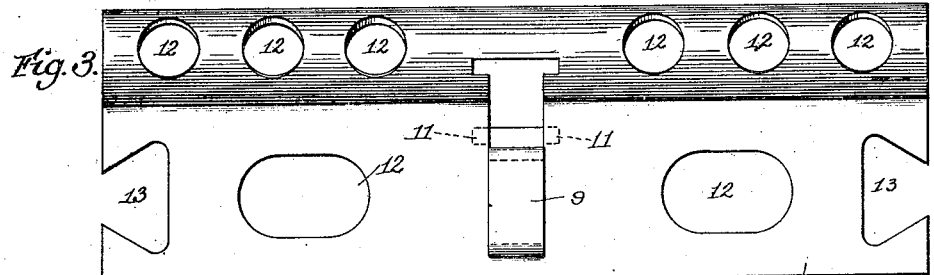
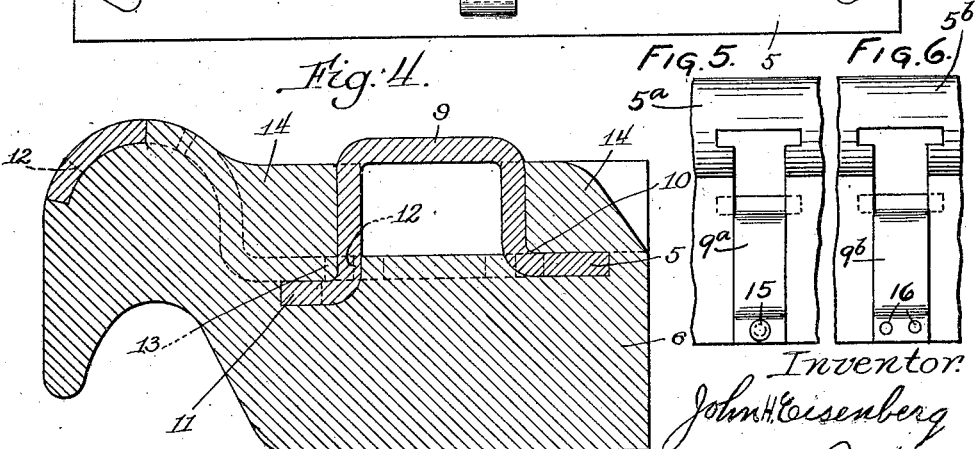
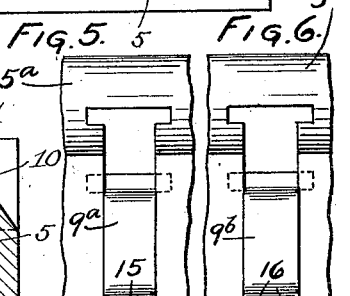
Inventor:
John H. Eisenberg
by Wm. O. Belt
Attys.

Patented Jan. 29, 1924.

1,481,862

UNITED STATES PATENT OFFICE.

JOHN H. EISENBERG, OF SUFFERN, NEW YORK, ASSIGNOR TO THE AMERICAN BRAKE SHOE & FOUNDRY COMPANY, OF WILMINGTON, DELAWARE, A CORPORATION OF DELAWARE.

BRAKE SHOE.

Application filed January 30, 1923. Serial No. 615,804.

*To all whom it may concern:*

Be it known that I, JOHN H. EISENBERG, a citizen of the United States, residing at Suffern, in the county of Rockland and State of New York, have invented certain new and useful Improvements in Brake Shoes, of which the following is a specification.

This invention relates to brake shoes and more particularly to those shoes provided with a reinforcing back; and its object is to provide a one piece back having a transverse section secured thereto to form the attaching lug and having its free end securely anchored under the back.

A further object of the invention is to provide a reinforcing back for a brake shoe which embodies a transverse section to form the attaching lug securely engaged with the back and adapted to be economically stamped out of one sheet of metal.

In the accompanying drawings I have illustrated a selected embodiment of the invention in a flanged brake shoe and referring thereto—

Fig. 1 is a plan view of a brake shoe embodying the invention;

Fig. 2 is a plan view of a blank cut to form the reinforce back;

Fig. 3 is a view similar to Fig. 2 showing a complete back;

Fig. 4 is a transverse sectional view on the line 4—4 of Fig. 1.

Figs. 5 and 6 are fragmentary views similar to Fig. 3 but showing other forms which my invention may take.

Referring to the drawings the brake shoe shown comprises the reinforcing back 5 and the body 6 which is cast on the back in the usual manner. The back is made from a blank 7 of suitable size, shape and gauge and a transverse section 8 is stamped up therefrom to form the attaching lug 9. The transverse section is attached at one end 10 to the blank and its other end is cut free from the blank and is provided with lateral projections 11. When the transverse section is stamped up as shown in Fig. 4 to form the attaching lug the free end is depressed below the plane of the back so that the lateral projections will slide under the side edges of the slot formed by stamping up the section to the position shown in Fig. 4 where these projections are anchored under the side edges of said slot. Thus the transverse section when formed into the attaching lug 9 is integrally connected at one end to the back and is securely anchored at its free end beneath the back and is adapted to stand all of the strains and stresses to which attaching lugs are subjected in handling and in service. The lug section may be secured to the back by riveting, welding or otherwise, instead of being integrally secured thereto. Thus in Fig. 5 I have illustrated a back 5ª which comprises an attaching lug 9ª rigidly secured to the back by means of a rivet 15. And in Fig. 6 I have illustrated a reinforcing back 5ᵇ having an attaching lug 9ᵇ spot-welded to the back as indicated at 16.

The back may be provided with any number of openings 12 and recesses 13 disposed in any desired manner to admit the body metal during the casting operation for connecting the back to the body.

The invention provides a reinforcing back which can be economically made out of a single piece of metal and provided by simple cutting and stamping operations with an attaching lug which is securely engaged with the back. The body metal may be run up at the sides of the lug as indicated at 14—14 to reinforce and strengthen it.

I have illustrated the invention in one type of flanged brake shoe but I do not wish to be understood as restricting the invention to this embodiment because it will be readily understood that it can be used in composite shoes and in shoes of a great variety of sizes and shapes as well as with backs constructed differently from that shown, without departing from the invention, and I reserve the right to make all such changes in the form, construction and arrangement of parts as clearly fall within the scope of the following claims.

I claim:

1. A back for a brake shoe having a strip bent to form an attaching lug for the shoe, said strip being secured at one end to the back and having its other end free but interlockingly engaged with the back.

2. A back for a brake shoe having a strip bent to form an attaching lug for the shoe, said strip being secured at one end to the back and having its other end free and interlockingly engaged with the underside of the back.

3. A back for a brake shoe having a transverse section stamped up therefrom to form an attaching lug for the shoe, said section being secured at one end to the back and having its other end provided with lateral projections engaging the underside of the back.

4. A back for a brake shoe formed from a single blank of sheet metal and having a transverse section cut therefrom along two sides and one end and integrally connected therewith at its other end, said section having its free end depressed and provided with lateral projections to engage the underside of the back and being bent between its ends to form an attaching lug for the shoe.

5. A brake shoe comprising a body and a reinforce back connected to the body, said back being formed of a single sheet of metal and having a transverse section cut and bent therefrom to form the attaching lug of the shoe, said section being integrally connected with the back at one end and having lateral projections at its other end engaged with the underside of the back, the body metal being extended up at the sides of the lug to reinforce and strengthen the same.

JOHN H. EISENBERG.